United States Patent [19]

Heidman, Jr.

[11] Patent Number: 4,796,002

[45] Date of Patent: Jan. 3, 1989

[54] ALARM SYSTEM FOR AUTOMOTIVE VEHICLES

[76] Inventor: William A. Heidman, Jr., 4604 Robbins, San Diego, Calif. 92122

[21] Appl. No.: 907,414

[22] Filed: Sep. 15, 1986

Related U.S. Application Data

[63] Continuation-in-part of Ser. No. 452,879, Dec. 27, 1982, and a continuation-in-part of Ser. No. 501,382, Jun. 6, 1983, abandoned.

[51] Int. Cl.⁴ .................. B60R 25/04; B60R 25/10
[52] U.S. Cl. ..................... 340/64; 180/287; 307/10 AT; 340/52 D; 340/63
[58] Field of Search .............. 340/52 R, 63, 64, 75, 340/81 R, 88, 96, 541, 636, 52 D; 307/10 AT; 180/287, 289

[56] References Cited

U.S. PATENT DOCUMENTS

| | | | |
|---|---|---|---|
| 2,831,176 | 4/1958 | Liberto | 340/96 |
| 4,016,537 | 4/1977 | Ray | 340/64 |
| 4,107,543 | 8/1978 | Kaplan | 340/64 |
| 4,150,731 | 4/1979 | Tannenbaum | 340/64 |
| 4,151,507 | 4/1979 | Willis | 340/64 |
| 4,151,508 | 4/1979 | Hensler et al. | 340/64 |
| 4,223,296 | 9/1980 | Kim et al. | 340/52 D |
| 4,262,277 | 4/1981 | Abonia | 340/52 D |
| 4,320,382 | 3/1982 | Roucek | 340/63 |
| 4,354,174 | 10/1982 | Heidman, Jr. | 340/63 |
| 4,480,249 | 10/1984 | Heidman, Jr. | 340/63 |
| 4,575,706 | 3/1986 | Heidman, Jr. | 340/63 |

Primary Examiner—Donnie L. Crosland
Assistant Examiner—Brent A. Swarthout
Attorney, Agent, or Firm—Frank D. Gilliam

[57] ABSTRACT

In an automotive vehicle alarm system the opening of selected movable vehicle structural panels when the alarm system is activated initiates the operation of a first timer's timing sequence which cause alternate operation of low and high frequency or sound level blasts from selected horns; flashing of all of the directional lamps; opening of the electrical supply to the vehicle ignition fuel pump and starter motor circuits and the initiation of a second timer's timing sequence which provides a parallel means for the opening of the electrical supply to the vehicle ignition, fuel pump and starter motor. The timing sequence of the first timer is approximately two to three minutes and cannot be terminated by the closing of the opened structural panel switch which activates the horns and flashing of all of the directional lamps. However, cutting the wires to operational lock switches will terminate the horns and flashing lamps. The second timer's timing sequence of approximately five minutes is uninterruptable in that opening of any switch associated with alarm energizing circuits or the cutting of wire or wires to the initial operational lock switches will not affect the operation of the second timer. During the uninterruptable operation of the second timer, the vehicle operator must wait for the timing sequence to run its course before the car can be started. The system may be activated from within the vehicle interior or exterior thereof. The activating switches may have multiple positions and require inward translation prior to changing switch positions.

19 Claims, 2 Drawing Sheets

ALARM SYSTEM FOR AUTOMOTIVE VEHICLES

This application is a continuation-in-part of my copending U.S. Application having Ser. No. 452,879, filed on Dec. 27, 1982, and Ser. No. 501,382 filed on June 6, 1983, now abandoned.

BACKGROUND OF THE INVENTION

Recently at least one model of the Cadillac automobile manufactured by General Motors has been available with a theft deterrent alarm system. When activated or armed anyone unlocking the automobile from the outside, for example, through an open window, causes the horn to blast intermittently and the headlamps to flash on and off. A starter disablement circuit associated therewith, thereafter prevents the automobile engine from being started by its conventional ignition key. The Cadillac system can be inactivated by unlocking the vehicle outside door lock. Although I do not fully understand the details of the Cadillac alarm circuit, I believe the system would become inoperative if a wire to the door lock was cut or removed.

In my prior U.S. Pat. Nos. 2,519,758; 2,520,363; 2,521,516; 2,766,343; 3,263,211; 3,372,373; 3,372,374 and 4,575,706; and 4,354,174 and my pending U.S. patent application having Ser. No. 387,457, filed June 11, 1982, now U.S. Pat. No. 4,638,296 and U.S. Pat. No. 4,480,249 issued Oct. 30, 1984, I have disclosed combined ignition and starter switches, circuits and locks, as well as an operated flashing hazard light and horn circuits which are adopted to be incorporated into the electrical systems of existing automotive vehicles with readily available and inexpensive components.

SUMMARY OF THE INVENTION

The present invention is directed to automotive vehicle alarm systems and particularly to a theft deterrent system which can easily and inexpensively be incorporated into existing automotive vehicle electrical systems.

This invention provides means for interconnecting existing door operated courtesy interior light switches and adding similar type switches at various other locations, such as, the trunk, hood, sun roof, fuel filler access door, etc., where they are operated by the opening or removal of these and similar normally closed vehicle panels. The opening of any of these vehicle panels when the alarm is activated causes a selected vehicle horn or horns to alternately blast, the vehicle directional lamps to flash and initiate a second timer's timing sequence which render the engine starter and/or fuel pump and/or ignition inoperative for an uninterruptable timed period. The starter and/or fuel pump, and/or ignition remain inoperative for uninterruptable length of time even if the alarm system is rended inopertive during the running of the uninterruptable timed period.

The system further provides an illuminated sentinel hood ornament when the vehicle key is removed from the ignition switch.

The alarm circuit includes isolation and normally open switch means which allow normal operation of the vehicle horn, starter, fuel pressure, ignition circuits, interior lamp circuits and directional and parking lamps.

It is therefore an object of this invention to provide a vehicle alarm system that will provide attention getting alternate blasting of the horns of different intensity levels and/or frequency upon an unauthorized opening of a vehicle panel.

Another object of this invention is to render one or more of the engine starter, electric fuel pump and ignition circuits inoperative for a timed period, during visual and audio alarm activation or after the alarm system is turned off.

A further object of this invention is to provide a vehicle interior activation switch for the activation of the vehicle alarm system by the occupants within the vehicle.

A further object of this invention is to provide alarm activation from the interior of the vehicle only when the ignition switch is either in the accessory or on position.

A further object of this invention is to interconnect the hazard lights of an automotive vehicle for activation by the alarm system.

A further object of this invention is to provide a selection of alternating horn intensity levels by the use of two horns and alternating the two horn activation or alternating the operation of one horn with two horns in combination.

A further object is to provide an external door lock switch that rotates to an anti-theft position by rotating the key passed the locked position.

A further object is to provide a lock switch that rotates to an anti-theft position by first pushing the key inwardly when in the locked position.

Still a further object of this invention is to utilize the atuomotive vehicle door key lock and/or a similar lock located on the fuel access door by combining these locks with switches for activation of the alarm system.

Still another object of this invention is to provide an automotive alarm system that can be easily incorporated into the conventional vehicle wiring of the horns, all directional lamps, and interior lamps of an automotive vehicle.

These and other objects of this invention will become apparent from the following detailed description taken together with the accompanying drawing figures.

BRIEF DESCRIPTION OF THE DRAWING FIGURE

DETAILED DESCRIPTION OF THE DRAWINGS

Figure 1:
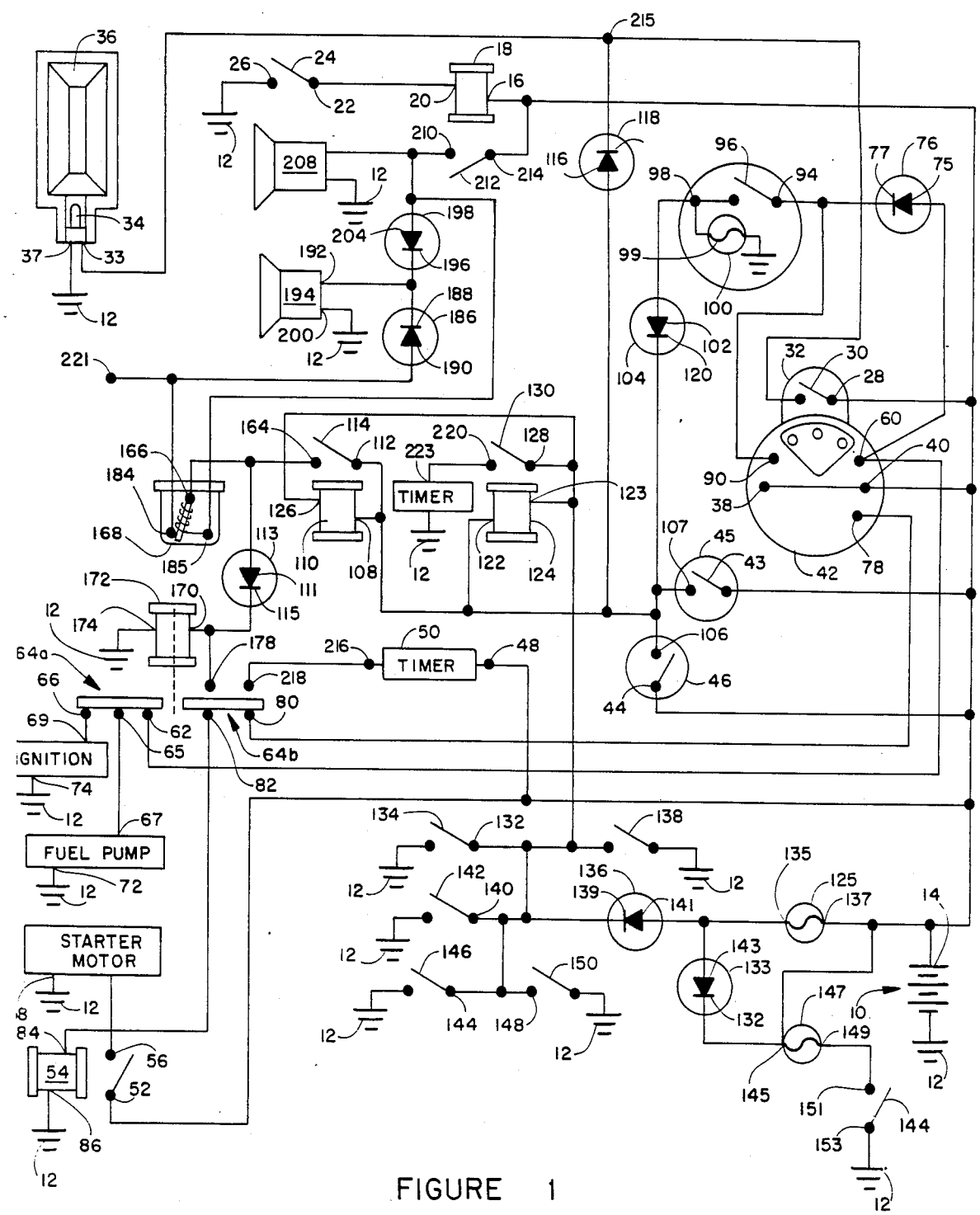
FIG. 1 depicts the electrical schematic of one embodiment of the invention, alternating the operation of both horns with only one of the horns for audio alarm signaling and both horns together for normal vehicle horn operation.

Referring now to FIG. 1, reference numeral 10 designates a conventional automobile battery having negative and positive electrical connections 12 and 14 respectively. The positive electrical connector 14 is connected to terminal 16 of the activating coil of the vehicle horn solenoid 18. The opposite end of the activating coil of the solenoid 18, terminal 20, is connected to contact 22 of a horn activating switch 24. Terminal 26 of the horn activating switch is connected to the battery negative connection 12.

The positive connection 14 of the battery 10 is further connected to terminal 28 of a key activated switch 30. The terminal 32 of the key activated switch 30 is connected to one element 33 of a light emitting diode (LED) 34 within a protective and illuminatable translucent hood ornament 36 and to the cathode 214 of diode 118. The other element 37 of the LED lamp 34 is connected to the negative connection 12 of battery 10.

The positive connection 14 of the battery 10 is also connected to the accessory and ignition terminals 38 and 40 respectively of the automobile ignition switch 42, to terminal 44 of an alarm activating switch 46 which is generally located exterior of the vehicle, to terminal 48 of a timer 50, to terminal 52 of the starter solenoid 54 and to terminal 43 of a key lock door switch 45. The end of the starter motor winding is connected to terminal 12 of the battery 10. Timer 50 is a solid state timer similar to the auto alarm timer readily available. It should be understood that any equivalent timer can be used to practice this invention which has the required running time.

Terminal 60 of the ignition switch 42 is connected to terminal 62 of a circuit interrupter solenoid switch 64a. Terminals 65 and 66 of normally closed solenoid switch 64a are connected respectively to terminal 67 of the automobile fuel pump 68 and terminal 69 of the automobile ignition 70. Terminal 72 of the fuel pump 68 and terminal 74 of the ignition system 70 are connected to the negative connection 12 of battery 10.

Terminal 60 of the ignition switch is also connected to anode 75 of diode 76.

Terminal 78 of the ignition switch 42 is connected to terminal 80 of solenoid switch 64b. Terminal 82 of switch 64b is connected to terminal 84 of the starter solenoid 54 terminal 86, the opposite end of the activating coil of the starter solenoid is connected to the negative connection 12 of battery 10. Terminal 88 of starter motor 58 is connected to negative connection 12 of battery 10.

Terminal 90 of the ignition switch 42 is connected to the cathode 77 of diode 76 and to terminal 94 of a second alarm system activating switch 96 which is accessible only from the interior of the vehicle. Terminal 98 of switch 96 is connected to one end of the element 99 of lamp 100 and to the anode 102 of diode 104, the opposite end of the element 99 is connected to the negative connection 12 of battery 10.

Terminal 106 of activating switch 46 and terminal 107 of exterior key lock door switch 45 are connected to terminal 108, one end of the energizing coil of relay 110, to terminal 112 of switch 114 associated with relay 110, to the anode 116 of diode 118, to the cathode 120 of diode 104 and to terminal 122 at one end of the energizing coil of the holding relay 124.

Terminal 126 of the activating coil of relay 110 is connected to terminal 128 of relay switch 130, to right hand door switch 134, left hand door switch 146, hood switch 142, trunk switch 138, fuel door switch 150 to the cathode 139 of diode 136. Terminal 135 of courtesy lamp 125 is connected to the anodes 141 and 143 of diodes 136 and 133 respectfully. Terminal 137 of courtesy lamp 125 is connected to the cathode 132 of diode 133, to terminal 145 of dome lamp 147 and to the positive connection 14 of battery 10. Terminal 149 of courtesy lamp 147 is connected to terminal 151 of courtesy dome light switch 144. Terminal 153 of switch 144 is connected to the negative connection 12 of the battery 10. One end of switches 134, 138, 142, 146 and 150 are connected to the negative connection 12 of battery 10.

Terminal 164 of relay switch 114 is connected to terminal 166 of a flasher or interrupter element 168 which alternately switches the voltage at terminal 166 between terminals 168 and 185 when activated and to the anode element 111 of diode 113. The flasher element 168 is fully described in my co-pending U.S. patent application Ser. No. 387,452, now U.S. Pat. No. 4,638,296 (FIG. 2) and is commonly used for alternated flashing of lights, etc. on emergency vehicles such as ambulances, fire trucks, police vehicles and the like. The cathode 115 of diode 113 is connected to terminal 170 of the activating coil of solenoid 172 and to the normally open contact 178 of switch 64b. The terminal 174 which is at the opposite end of the activating coil of solenoid 172 is connected to the negative connection 12 of battery 10.

Terminal 184 of the flasher element 168 is connected to the anode 190 of diode 186, cathode 188 of diode 186 is connected to terminal 192 of horn 194 and to the cathode 196 of diode 198. Terminal 200 of the horn 194 is connected to negative connection 12 of battery 10.

Terminal 185 of the flasher element 168 is connected to anode 204 of diode 198, to the horn 208 and to terminal 210 of horn activating relay switch 212 associated with relay 18. Terminal 214 of switch 212 is connected directly to the positive connection 14 of battery 10. Both horns 194 and 208 operate when switches 24 and 212 are closed. It should be understood that horn 208 emits a louder sound than horn 194 and accordingly the ativating coil of horn 194 operates with less current drain than horn 208. It should be further understood that only low current drain horn 194 sounds when the directional hazard lamps illuminate. This feature greatly reduces current drain when compared with operating both horns and directional lamps simultaneously as taught by my prior patents.

The cathode 214 of diode 118 is connected to a common connection 215 with terminal 32 of switch 30 and element 33 of LED lamp 34.

Terminal 216 of timer 50 is connected to the normally open contact 218 of switch 64b.

Terminal 220 of switch 130 is connected through timer 223 to the negative connection 12 of battery 10.

Timer 50 provides an open circuit between terminals 48 and 216 when in its normal non-operating state, and when in its operating state provides a closed, or common, circuit connection between terminals 48 and 216 thereby supplying +12 volts from battery 10 through timer 50 to contact 218 of switch 64b. Like timer 50, timer 223 provides an open circuit between terminals 128 and 220 when in a non-operating state and provides a closed, or common circuit therebetween when the timer is in its operating state.

Figure 2:
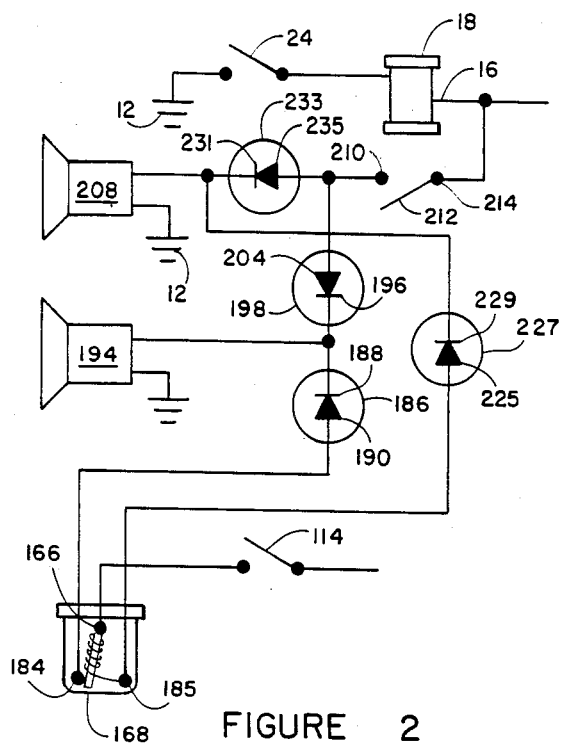
FIG. 2 depicts a second embodiment with connection of the two horns for alternating the operation of each of the horns for audio alarm signaling.

FIG. 2 depicts a second embodiment of horn alternating sequence whereby one horn alternates with the other horn when the alarm of the invention is activated. Terminal 166 of flasher element 168 is connected to the anode 111 of diode 113 and terminal 164 of switch 114 as discussed above. Terminal 185 of flasher element 168 is connected to the anode 225 of diode 227 and the cathode 229 of diode 227 is connected to the cathode 231 of diode 233 and the activating relay coil 18 of conventional car horns 208 and 194. Terminal 184 of flasher element 168 is connected to anode 190 of diode 186 and the cathode 188 of diode 186 is connected to the cathode 196 of diode 198 and the horn 194. The opposite ends of the connections to horns 194 and 208 are connected to terminal 12 of battery 10. The anode 204 of diode 198 is connected to anode 235 of diode 233 and to terminal 210 of horn activating switch 212. When the steering wheel mounted horn activating switch 24 and the conventional horn relay switch 212 are closed both horns activate together normally as shown in the circuit of FIG. 1.

Figure 3:
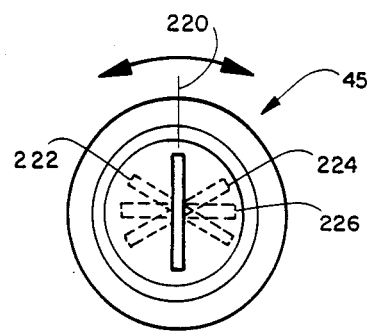
FIG. 3 is the front view of a door lock alarm activation switch.

FIG. 3 depicts an example of the door key lock switch 45. The lock has the outer appearance of a conventional external key door lock generally found on the exterior of the front doors of an automotive vehicle. The operation of the lock combined with a switch, however, is different. The conventional lock has three positions, namely, a neutral key insert/remove, a door lock, door unlocked position. The combination key lock switch 45, shown in FIG. 3 has four positions, namely, the conventional door locked position 224, the door unlocked position 222, and the neutral, key insert/remove position 220 and in addition an anti-theft alarm activated position 226. The lock is designed so that the key (not shown) can only be inserted or removed in the key insert/remove neutral position 220 and the anti-theft alarm activated position 226. Further the lock is designed so that it can be turned between locked, unlocked and neutral positions in a conventional manner, and turned between the locked and anti-theft activated position from the neutral position only by pushing the key against an internal switch spring and then turning the key as disclosed in my U.S. Pat. No. 2,520,363 or U.S. Pat. No. 2,519,758 directed to a combined ignition and lock switch which are hereby incorporated by reference. The difference between this invention and my prior patent last mentioned is that when the lock and switch are in the locked position shown as 224 in FIG. 3, the key locked cylinder must be "pushed in" and in this (pushed in) position, the lock cylinder and switch can be rotated to the anti-theft position, whereupon the activating key can be removed.

Figure 4:
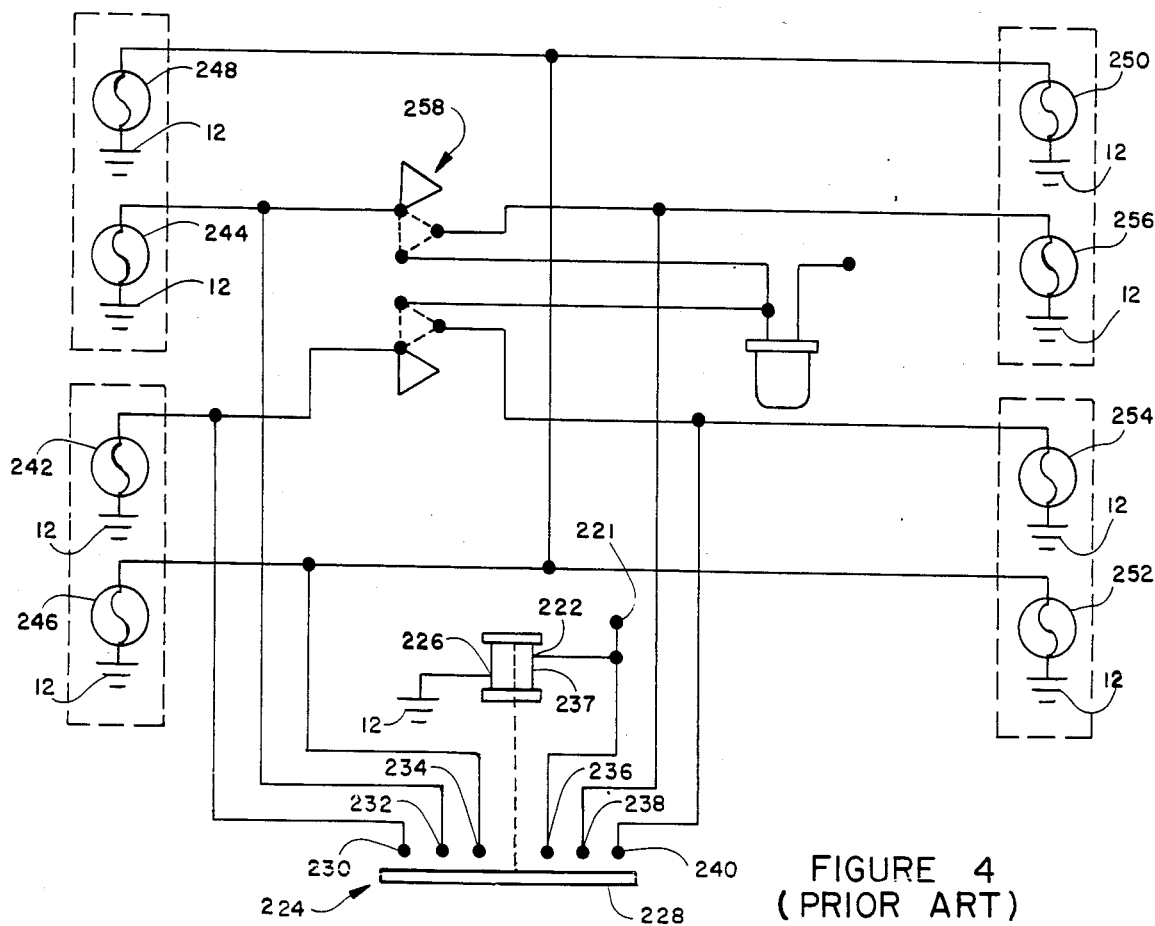
FIG. 4 is an electrical schematic for connecting the directional signal lights to the alarm system of FIGS. 1 or 2.

FIG. 4 depicts a schematic showing of the hazard warning circuit of a conventional automotive vehicle. This circuit when utilized with the alarm system of the invention would be interconnected to the circuit of FIG. 1 whereby the front and rear directional and parking lamps will intermittently flash. Terminal 221 of FIG. 4 is connected to terminal 221 of FIG. 1. Terminal 221 is connected to terminal 222 of the coil of the switch activating solenoid 237. The other end of this coil is connected to the battery negative terminal 12. The movable portion 228 of the switch 224 is shown in its normally biased non-contacting or open position. The stationary terminals of the switch are numbered 230–240. Terminal 230 is connected to one vehicle rear directional lamp 242, terminal 232 is connected to the other vehicle rear directional lamp 244, terminal 234 is connected to the front and rear vehicle parking lamps 246–252, terminal 236 is connected to terminal 222 of relay switch 224, terminal 238 is connected to the vehicle front directional lamp 256 and terminal 240 is connected to the vehicle front directional lamp 254. The other terminal of lamps 246–252 are connected to the battery negative terminal 12. The remainder of the directional signal switch 258 is wired in the same or similar manner as that taught by my U.S. Pat. No. 4,354,174.

When positive voltage is applied to terminal 221 from the activation of the anti-theft system, voltage is applied to terminals 230–240 causing the vehicle parking and directional lamps to flash at the rate and sequence of flasher element 168, namely, when positive voltage is applied to terminal 184 thereof.

THEORY OF OPERATION

To energize the alarm system when the ignition switch 42 is in the off position, as shown, either switch 46 or switch 45 or both are closed, that is terminals 44 and 106 of switch 45 or terminal 43 and 107 of switch 45 are made common. The alarm system is now activated and ready for use.

The closing of either of the normally open switches 134, 142, 146, 138 or 150 by the opening of an associated vehicle panel causes current from battery terminal 14 to flow through either switch 45 or 46, through the activating coil of relay 110, closing switch 114, through the activating coil of the holding relay 124 closing switch 130, energizing timer 223, through switch 114 to terminal 166 of the flasher element 168 to either terminal 185 or 184 to (depending on the position of the activating arm connected to terminal 166) horns 194 and 208 combined or to horn 194 respectively, to the activating winding of relay 172 causing the separate switches 64a and 64b to open the fuel pump, starter and ignition electrical supply lines, and connect terminal 216 of the now activated timer 50 to terminal 170 of relay 172.

The result is that the lamp 125 illuminates and the selected horns blast alternately and the fuel pump, vehicle engine starter and ignition circuits are rendered inoperative. When the closed or activated switch 134, 142, 146, 138 or 150 is again returned to its normally open position by the closing of the associated open vehicle panel, the system remains activated due to switch 130 remaining closed until the timer 223 runs through its timing sequence. When the terminals 62, 65, 66, and 82 are opened by the initial energizing of the coil of relay 172, the fuel pump, ignition, and starter circuits remain open and inoperative until the uninterruptable timing sequence of timer 50 runs its normal course. Generally, the timers 50 and 223 will operate the horns three to five minutes after the switch 134, 142, 146, 138 or 150 is closed. The opening of switches 45, 46, and/or 96 terminate the horn blasts and flashing lamps regardless of the operation of the uninterruptable timing sequence of timer 50; however, the fuel pump, vehicle starter and ignition switch circuits are not provided with any means for reactivation unitl the uninterruptable timing sequence of timer 50 is completed. Hence, the breaking of one or more of the locks or the opening of the locked switches will not de-energize relay 172 to complete the starting, ignition or fuel pump electrical circuits. Relay 172 and timer 50 would be concealed or otherwise positioned in the vehicle so that they would not be readily available for tampering. It should be obvious that once solenoid 172 is activated, even the vehicle operator has no way to start the vehicle and must wait for the termination of the uninterruptable timing sequence of timer 50 before the vehicle can be started.

In FIG. 1 when the alarm is activated the blast of horn 194 will alternate with combined horns 208 and 194 and in the FIG. 2 circuit the blasting of horns 194 and horn 208 will alternate.

When the ignition switch 42 is in either the accessory position, that is terminals 38 and 90 are made common or in the ignition on position, that is terminals 40 and 60 are made common, switch 96 is an additional alarm system activating switch which is located within the vehicle such as, for example, a van, motor home, etc. for occupant accessibility. Switches 45 and 46 being located outside of the vehicle are non-accessible by occupants for arming the alarm system from the interior when the vehicle is occupied and either switch 45 and/or 46 activate the alarm system from the vehicle exterior when the vehicle is unoccupied. The switch 96 includes a parallel lamp 100 which illuminates when the switch is closed, terminals 94 and 98 are made common.

The alarm system has the same apparent operation with either of the parallel switches 45, 46 or 96 activated.

When the ignition switch key, is removed from the ignition slot, switch 30 is caused to close illuminating the LED 34 of the sential hood ornament 36. The LED 34 remains illuminated illuminating the sentinal hood ornament 36 as additional visual protection as the sential hood ornament indicates that the vehicle is equipped with this alarm system. Merely removing the ignition key from the ignition switch will illuminate this sential hood ornament whether the alarm is activated or unactivated. In this manner, if the automobile operator forgets to activate the alarm a would be thief would not know for sure whether or not the alarm system is activated.

It should be understood that the horns, starter motor, fuel pump, ignition circuits, directional lamps and interior courtesy lamps will operate in their normal manner when the alarm system is inactivated and their normal operation will not activate the alarm system. Further, if only one horn is utilized such as only horn 208, then this horn operates alternately with the directional lamps (hazard). This divides the current loads rather than combining horn and lamps as taught by my prior patents.

My invention provides an alarm system that cannot be deactivated by the would be thief or the automobile operator by inadvertently setting off the alarm until timer 50 has completed its timing sequence.

It will be apparent to those skilled in this art that many modifications and variations may be effected without departing from the spirit and scope of the novel concepts of the present invention.

What is claimed is:

1. An alarm system for an automotive vehicle having first and second horns with different audible output sounds, a starter motor solenoid, an ignition circuit, an electric fuel pump and a source of electrical power comprising:
   a first activating switch means connected to said source of electrical power and switchable between at least on and off positions;
   an alarm activating means interconnected to said first activating means;
   an alternating flasher element having a first and second output with its input connected to said alarm system activating means, when activated said flasher element alternatingly connects said input between said first and second outputs;
   said first horn being connected to said first output,
   a timer means having a pre-determined running time connected between on and off positions connected to said alarm system activating means and said alternating flasher element; and
   a plurality of parallel connected switching means each switchable between on and off positions connected to said alarm system activating means, when said first activating switch means is in its on position and at least one of said plurality of parallel connected switching means activates said timer means, alternating the flasher element output between the first and second horns during the running of said timer means, whereby when said at least one or said plurality of parallel connected switching means is returned to an off position or disconnected the alternate sounding of said horns will continue to sound during the duration of the operation of said timing means.

2. The invention as defined in claim 1 wherein said timing means is connected between said alarm system activating means and said starter solenoid circuit causing said solenoid circuit to become inoperative during the duration of the operation of said timing means.

3. The invention as defined in claim 1 further including means for alternating the sounds from a combination of the first and second horns with the sound from the second horn.

4. The invention as defined in claim 1 wherein said first activating switch means is accessible from the exterior of the vehicle.

5. The invention as defined in claim 1 further including a second activating switch connected in parallel with said first activating switch, said first activating switch is positioned in and accessible only to the interior of the vehicle for occupant's use.

6. The invention as defined in claim 3 wherein said first activating switch means includes a neutral position.

7. The invention as defined in claim 3 wherein said activating switch means includes an anti-theft position.

8. The invention as defined in claim 3 wherein said activating switch means includes door locked, door unlocked, neutral and anti-theft positions.

9. The invention as defined in claim 1 wherein said automotive vehicle further includes an electric fuel pump and ignition circuits interconnected to said timer means whereby said fuel pump, said ignition circuit and starter circuit are inoperative during the duration of the operation of said timer.

10. The invention as defined in claim 9 wherein said timer means comprises a single timer element for the alternate sounding of the horns and the inactivation of said electric fuel pump, ignition and starter circuits.

11. The invention as defined in claim 5 further including a third activating switch means positioned external of the vehicle.

12. The invention as defined in claim 3 wherein an isolation means is provided between said system activating means and horns whereby normal operation of the horns does not energize said alarm system or initiate the start of the operation of said timer means.

13. The invention as defined in claim 1 wherein said automotive vehicle further includes a key operated ignition switch having accessory and ignition positions and a switching means which is moved from an on to an off position when said key is inserted therein and said alarm system further includes a hood ornament LED illuminating means which illuminates when the key has been removed from said ignition switch.

14. The invention as defined in claim 1 wherein said vehicle further comprises front and rear directional and parking lights and said alarm system further comprises means for flashing of said directional and parking lights on and off when activated.

15. The invention as defined in claim 14 wherein said alarm system further comprises isolation means which prevents normal operation of said directional and parking lights from activating said alarm system.

16. The invention as defined in claim 1 wherein said vehicle further comprises an interior light and said alarm system further comprises means for illuminating said interior when activated.

17. The invention as defined in claim 16 wherein said alarm system further comprises isolation means which prevents normal operation of said interior light from activating said alarm system.

18. The invention as defined in claim 1 wherein said timer means comprises a timer having an uninterruptible predetermined run time, said run time is started by activation of said alarm system activating means, said timer is connected in series between said source of electrical power and said starter motor solenoid, ignition circuit and electrical fuel pump and disconnects said source of electrical power therefrom during said run time, changing said first activating switch means from on to off, whereby disconnecting the electrical connections from said at least one of said plurality of parallel connected switching means will not terminate the timed run of said timer.

19. An alarm system for an automotive vehicle having horns, exterior lamps on each longitudinal side of said vehicle and a source of electrical power comprising:
 a key operated ignition switch operable between on, off and accessory positions having an input connected to said source of electrical power and an output, said ignition switch connecting electrical power from said source of electrical power to said alarm system only when in said on and accessory positions, whereby the key is removable only in said off position;
 an alarm activating switch means located within the interior of said automobile having an input and an output, said alarm activating switch means operable only from the interior of said automobile, said input of said alarm activating switch means connected to the output of said ignition switch; and
 an alarm system activating means having an input and an output, said of said alarm system activating means connected to the output of said activating switch means; and
 a flasher element having an input and an output, said input of said flasher element connected to said output of said alarm system activating means, when activated said flasher element sequentially connects power from its input to its output;
 said horns and exterior lamps being connected to said output of said flasher element, when said ignition switch is in its on or accessory positions, said alarm activating switch means is in its on position and said alarm system activating means activates said alarm system, said horns and exterior lamps are alternately activated and deactivated according to the flasher element output.

* * * * *